2,723,253

THERMO-SETTABLE INTERMEDIATE CONDENSATION PRODUCTS

James W. Wandell, Bronx, N. Y., assignor of one-half to Sidney Haas, Scarsdale, N. Y.

No Drawing. Application October 25, 1952, Serial No. 316,940

10 Claims. (Cl. 260—71)

This invention relates to thermo-settable intermediate condensation products, i. e. thermo-setting molding powders, and to a process for making the same.

More particularly my invention pertains to a molding powder of the character described which includes fillers and which constitutes the reaction product of formaldehyde and urea or formaldehyde and a urea derivative such as a thiourea, an aryl urea or a benzyl urea.

It is an object of my invention to provide a low pressure, fast curing, thermo-setting molding powder of the character described for hot compression molding, the powder being of such nature that it will flow freely in the mold and will form articles that are stable and free from gas pockets and blisters and other types of imperfections which are caused by gases created during the molding cycle.

It is a more specific object of my invention to provide a gas free molding powder of the character described whose intermediate condensation syrup has the proper characteristics for satisfactory admixture with the filler.

Other objects of my invention in part will be obvious and in part will be pointed out hereinafter.

My invention accordingly consists in the compositions and steps hereinafter described and of which the scope of application will be indicated in the appended claims.

In general I carry out my invention by reacting urea with an excess of formaldehyde in an aqueous carrier to produce a syrupy intermediate condensation product. The reaction desirably, although not necessarily, is carried out at an alkaline pH. After the reaction has reached a certain stage the resultant syrupy mass is neutralized and a filler added. The ratio of formaldehyde to urea and the stage at which the reaction (condensation) is stopped are such that the syrupy mass can be admixed readily with the filler. At this time there also are incorporated in the mass an additional amount of urea and any other additives that are to be present in the finished molding powder, as for example plasticizers and dyes. The resulting composition thereupon is passed through a pair of hot rolls, the passage being sufficiently rapid at the temperature employed to prevent advancing (condensing) the molding powder too far for hot compression molding. However, the temperature and time of contact are sufficient both to dry the mass, i. e. free it from water, and to react the excess formaldehyde in the mass with the additional urea so that the molding powder which emerges from the hot rolls will be capable of being thermo-set to form an article that is free from gas defects.

More particularly in the initial reaction between the urea and formaldehyde, a formaldehyde-urea molecular ratio of from 2½ to 1, to 1¾ to 1 is employed. However, sufficient urea is added after the initial reaction and is subsequently reacted to provide an end ratio of formaldehyde to urea of from 1½ to 1, to 1¼ to 1. I have found that a filled powder with an end ratio within the latter range will produce a hot compression molded article which is free from gas blisters, gas pockets and the like.

Specifically, pursuant to my invention I add urea to an aqueous solution of formaldehyde, i. e. formalin, in a ratio within the initial range mentioned. I also add to the liquid an alkalizing agent such as barium hydroxide. The pH of the solution is adjusted to about 8.0, as by addition of an acidifier such as acetic acid. The formaldehyde and urea or urea derivative will react, the speed of reaction depending upon the temperature and pH. The higher the temperature and the higher the pH above neutrality the quicker the reaction will take place, as is well known to the art. For example, if the solution is raised to 212° F. the reaction will be completed in within one half to one hour. If the solution is left at room temperature, about 70° F., the reaction will take about twenty-four (24) hours to complete. In general it is considered that the initial reaction is complete, i. e. the condensation has proceeded far enough, when the first signs of turbidity appear in the liquid.

If desired the initial reaction can be carried out at an acid pH, e. g. as low as 5½, and it should be understood that the mechanics of the first reaction are not part of my invention except that a high formaldehyde to urea molecular ratio is employed and the reaction is not allowed to proceed any further than it has heretofore.

The initial reaction is effectively arrested by reducing the temperature to room temperature, i. e. to about 70° F. and by bringing the pH to substantially neutral, i. e. to about 7.1 to 7.3. Obviously if the initial reaction has been carried out at room temperature it is stopped simply by bringing the pH substantially to neutral. Conveniently the liquid is neutralized by the addition of a mild acid, such as acetic acid. It may be observed that at this pH and room temperature the liquid may be left for substantial periods of time, for example, up to a month, without any noticeable change in the stage of reaction.

The initial reaction liquid mass has a syrupy consistency.

Heretofore in commercially practicing the manufacture of thermo-setting formaldehyde-urea molding powders, the tendency has been to maintain the molecular ratio of formaldehyde to urea quite high, e. g. about 2, inasmuch as when with this ratio the initial reaction is stopped at the first signs of turbidity the mass still is relatively watery and therefore can be admixed easily with a filler. However, where such a high ratio is employed the molding powder which subsequently is formed is characterized by a strong tendency to produce gases during the molding cycle, this being the case even where fixing agents such as urea are added to the molding powder. On the other hand if the molecular ratio of formaldehyde to urea is made low in order to avoid formation of gas during molding, the reaction mass is so syrupy that it is very difficult to mix with a filler. Indeed if the filler is porous, for example, wood flour, it is commercially impractical to obtain a satisfactory mix with a starting ratio of less than 2.

However, in accordance with my invention I am able to adjust the starting ratio to a desirable figure independent of the ratio in the finished powder. Thus, for example, where particularly porous fillers are employed I can use a starting ratio of as high as 2½ to 1 and yet by adding more urea after the initial reaction and incorporation of the filler I can achieve an end ratio that will yield substantially no gases during molding.

In the practice of my invention satisfactory starting molecular ratios range from 1¾ to 2½ moles of formaldehyde to 1 mole of urea and satisfactory end molecular ratios range from 1¼ to 1½ moles of formaldehyde to 1 mole of urea.

The urea which is added to the syrupy initial reaction mass is caused to react therewith in such manner as not to militate against moldability of the final stable intermediate condensation product. This second reaction is carried out with extreme rapidity and under critically controlled conditions so as not to permit the reaction product to reach too advanced a stage of polymerization. Said second reaction is effected by maintaining at a substantially neutral pH, e. g. between 7.1 and 7.3, the mixture of the initial syrupy reaction mass, the filler, the added urea and the additives and by raising the mixture to an elevated temperature for a very short period of time only.

As noted above, the reaction between formaldehyde and urea is effected both by pH and temperature. By keeping the pH neutral and by quickly raising and lowering the temperature the second reaction can be accurately controlled. Moreover, the high temperature at which the second reaction is carried out dries off the watery carrier, i. e. dries the mixture so that it is ready for molding use.

To carry out the second reaction, the mixture of initial reaction mass, filler, extra urea and additives, which at this stage is a viscous mass, is passed between and in contact with two heated revolving rolls, the temperature of the rolls being maintained at between 270° F. and 300° F. The mixture is in contact with the rolls for a period of between 5 and 20 seconds. The longer period of time and the higher temperature of the rolls is suitable for the lower pH's, e. g. a pH of approximately 7.1. The lower temperature and shorter period of time is suitable for higher pH's, e. g. a pH of approximately 7.4. When the pH is adjusted to approximately 7.2 in the preferred practice of my invention, the temperature of the rolls should range between 280° F. and 290° F. and the period of contact should range between 10 and 15 seconds. The space between the rolls preferably is between five and twenty mils.

I have found that during passage through said rolls the added urea reacts violently and consolidates with the formaldehyde of the initial condensation product, thus drying off and fixing any free or loosely held formaldehyde. There is a slight advance, i. e. polymerization, of the resin, but the advance is so small, because the temperature is not permitted to become high enough and because the time of heating is kept so short, that the advance does not deleteriously affect the product. Nevertheless, the desired molecular change of the initial condensation product has been effected. This comparatively short period of contact of the viscous mass with the heated rolls not only will carry out the second reaction but also suffices to substantially dry the twice reacted mass, thus making further certain that the formaldehyde-urea reaction is arrested at room temperatures even over long periods of time, and resulting in a dried and stable product.

I have found that by adding urea and causing a second reaction in the foregoing manner, i. e. by brief contact with the heating rolls, a complex reaction is caused. The condensation and reaction changes the molecular structure of the initial condensation product to the desired molecular ratio of the end condensation product. The free formaldehyde and also the loosely held formaldehyde is drawn off thus producing a gas-free, low pressure, stable thermo-settable molding compound of superior quality which when molded at approximately 300° F. and 2,000 pounds per square inch pressure forms stable infusible articles without evolution of volatiles sufficient to cause blistering.

By way of illustration only and without limiting the invention thereby I have set forth below one specific manner in which my invention can be performed.

Twenty parts by weight of urea are added to fifty-six parts by weight of a 40% aqueous solution of formaldehyde (40% formalin). To this there is added sufficient barium hydroxide and acetic acid to adjust the pH to 8 and the mixture is allowed to stand for approximately twenty-four hours. When the first signs of turbidity appear the initial reaction is complete and is arrested by adding additional acetic acid to bring the mass to a pH of approximately 7.2. Next there is added to this syrupy watery mass a filler such for instance as wood flour, sulfite pulp, asbestos or the like. The proportions of the syrupy mass and filler may be varied as is well known in the art, depending upon the type of filler and the type of thermo-plastic condensation product desired. Typically the proportions of the initial condensation mass range from 60% to 40% by weight and the filler from 40% to 60% by weight. If the filler is particularly porous, water also may be added; the weight of water usually does not substantially exceed the weight of the filler. Customarily if water is employed it is added to the initial reaction syrup before the filler. The extra urea crystals are added to the initial reaction syrup either before or after water is added to it or before or after filler or other additives are incorporated.

It will be appreciated that I am able to obtain any specific molecular structure desired by use of my new method, this structure being dependent upon and determined by the quantity of urea added after the initial reaction and prior to drying. The compound produced by the process will after drying and grinding be of superior gas free quality and will be stable and have a greatly improved storage life.

It thus will be seen that I have provided compositions and methods which achieve all the objects of my invention and are well adapted to meet the conditions of practical use.

As various possible embodiments might be made of the above invention and as various changes might be made in the embodiments above set forth, it is to be understood that all matter herein described is to be interpreted as illustrative and not in a limiting sense.

Having thus described my invention, I claim as new and desire to secure by Letters Patent:

1. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and heating the resultant mixture for a short period of time at a temperature between 270° to 300° F. to quickly dry the mixture while simultaneously reacting the initial condensation mass with the urea to form the intermediate condensation product.

2. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and heating the resultant mixture for from five to twenty seconds at a temperature between 270° to 300° F. to quickly dry the mixture while simultaneously reacting the initial condensation mass with the urea to form the intermediate condensation product.

3. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and rapidly passing the resultant mixture between heated revolving rolls maintained at a temperature between 270° to 300° F. to quickly dry the mixture while simultaneously reacting the initial condensation mass with the urea to form the intermediate condensation product.

4. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and in from five to twenty seconds passing the resultant mixture between heated revolving rolls maintained at a temperature between 270° to 300° F. to quickly dry the mixture while simultaneously reacting the initial condensation mass with the urea to form the intermediate condensation product.

5. In a method of manufacturing a thermo-settable formaldehyde-urea intermediate condensation product, that improvement including the steps of adding urea to a substantially neutral aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and heating the resultant mixture for a short period of time at a temperature between 270° to 300° F. to quickly dry the mixture while simultaneously reacting the initial condensation mass with the urea to form the intermediate condensation product.

6. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, forming the mass into a layer having a thickness of from five to twenty mils and contacting each side of the layer with a heated surface maintained at a temperature between 270° to 300° F. for a period of from five to twenty seconds to quickly dry the mixture while simultaneously reacting the initial condensation mass with the urea to form the intermediate condensation product.

7. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and passing the mass in a layer having a thickness of five to twenty mils between and in contact with rotating rolls maintained at a temperature between 270° and 300° F. for a period of between five to twenty seconds to quickly dry the mixture while simultaneously reacting the initial condensation mass with the urea to form the intermediate condensation product.

8. In a method of manufacturing a thermo-settable formaldehyde-urea intermediate condensation product, that improvement including the steps of adding urea to an aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and passing the mass in a layer having a thickness of five to twenty mils between and in contact with rotating rolls maintained at a temperature between 280° to 290° F. for a period of between ten to fifteen seconds to quickly dry the mixture while simultaneously reacting the initial condensation mass with the urea to form the intermediate condensation product.

9. In a method of manufacturing a thermo-settable formaldehyde-urea intermediate condensation product, that improvement including the steps of adding urea to a substantially neutral aqueous syrupy initial formaldehyde-urea condensation mass having a filler incorporated therein, the molecular ratio of the formaldehyde to the urea in the initial condensation mass ranging from 2½ to 1¾ moles of formaldehyde to 1 mole of urea, the amount of urea added being sufficient to change the formaldehyde to urea molecular ratio to from 1½ to 1¼ moles of formaldehyde to 1 mole of urea, and passing the mass in a layer having a thickness of five to twenty mils between and in contact with rotating rolls maintained at a temperature between 280° to 290° F. for a period of between ten to fifteen seconds to quickly dry the mixture while simultaneously reacting the initial condensation mass with the urea to form the intermediate condensation product.

10. A thermo-settable formaldehyde-urea intermediate condensation product made by the process set forth in claim 1.

References Cited in the file of this patent

UNITED STATES PATENTS

| 2,056,454 | Howald | Oct. 6, 1936 |
| 2,329,172 | Smidth | Sept. 7, 1943 |
| 2,338,464 | Smidth | Jan. 4, 1944 |
| 2,393,752 | D'Alelio | Jan. 29, 1946 |

FOREIGN PATENTS

| 581,702 | Great Britain | Oct. 22, 1946 |
| 593,924 | Great Britain | Oct. 29, 1947 |